June 13, 1944.    L. SYKORA    2,351,558
FISHING CORK
Filed June 15, 1942
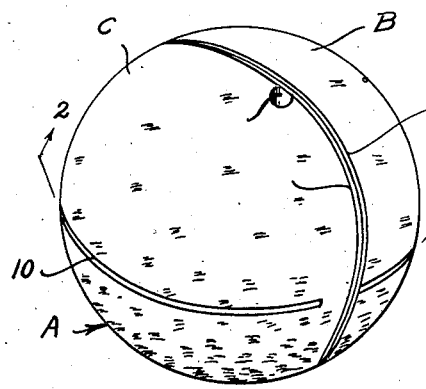
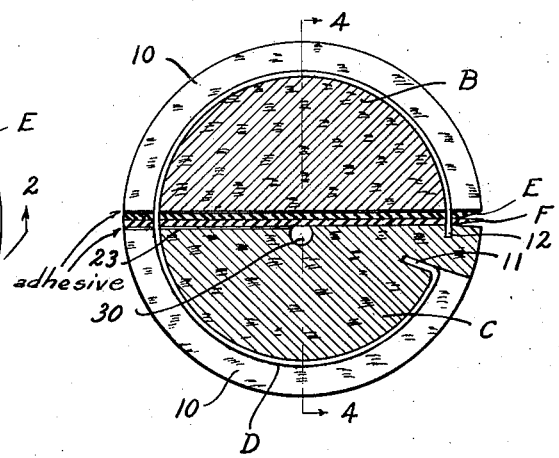
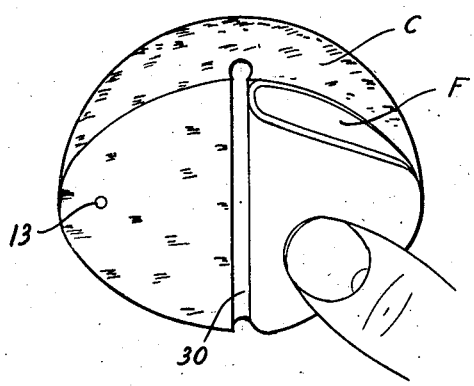
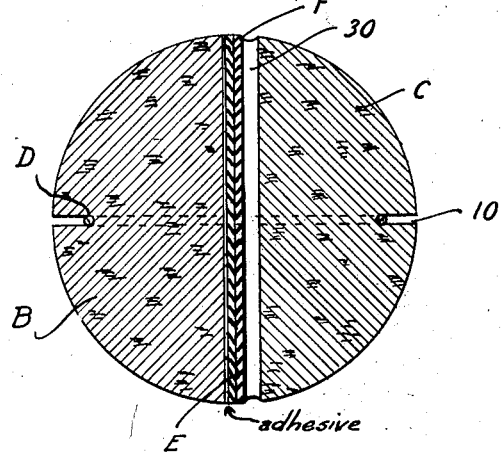
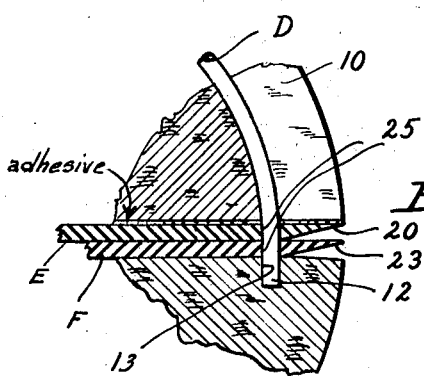
INVENTOR.
Louis Sykora.
BY Lancaster, Allwine & Rommel
ATTORNEYS.

Patented June 13, 1944

2,351,558

UNITED STATES PATENT OFFICE 2,351,558

FISHING CORK

Louis Sykora, Currie, Minn.

Application June 15, 1942, Serial No. 447,101

11 Claims. (Cl. 43—49)

This invention relates to improvements in fishing floats or bobbers.

The primary object of this invention is the provision of an improved float for fishing lines having improved means for detachable association with a fishing line so that it can be used as a float upon a casting line or a line used for stationary fishing.

A further object of this invention is the provision of an improved float having means for slidably clamping a fishing line thereon in an efficient and expeditious relation, so that the line may have the float associated therewith at any place along the length of the line, and from which position the float may be moved with facility and without liability of destruction to the line.

Other objects and advantages of this invention will be apparent during the course of the following detailed description.

In the accompanying drawing, forming a part of this specification, and wherein similar reference characters designate corresponding parts thruout the several views, Figure 1 is a perspective view of the improved float.

Figure 2 is a cross sectional view taken thru the float substantially on the line 2—2 of Figure 1.

Figure 3 is a perspective view showing one half of the float and illustrating that one half of the antifriction lining of the float is loosely associated therewith.

Figure 4 is a cross sectional view taken substantially on the line 4—4 of Figure 2.

Figure 5 is an enlarged fragmentary sectional view taken thru a portion of the float.

In the drawing, wherein for the purpose of illustration is shown only a preferred embodiment of the invention, the letter A may generally designate the improved float. It consists of sections B and C of hemispherical form, detachably and yieldably held together by a spring D. Between the facing surfaces of the float sections B and C are disposed friction providing linings E and F in a relation to be subsequently described.

The body C of the float is generally of spherical form, altho the float body may have an oblong form if so desired. Therefore, the sections B and C are hemispherical. They are held in complementary relation by means of the segmental shaped spring wire D. The facing surfaces of the sections define a way, the purpose of which will be subsequently mentioned. To accommodate the wire D, sections B and C are annularly grooved at 10, in a plane at right angles to the plane of the flat facing surfaces of the sections B and C. The wire D has one anchoring end 11 which is socketed in the material of the section C. The spring wire D extends annularly around the grooves 10, and at its free end portion 12 it is adapted to seat in a suitable socket opening 13, shown in Figures 2 and 3 of the drawing. This portion 12 transversely intersects the plane of separation of the two portions of the spherical body B for a purpose to be subsequently described. The depth of the recess 10 is optional, but it should be of such depth that the wire D will be completely hidden and embedded therein with no part thereof projecting from the float.

The friction providing lining discs E and F are preferably of rubber altho they may be of any other approved yieldable friction providing material which will not materially damage a line which is clamped firmly therebetween. The disc E is adapted to be glued by any suitable adhesive to the flat face of the hemispherical section B and it entirely covers said face. At the line entrance side of the float A, this rubber lining E is beveled at 20, to facilitate line insertion.

The disc lining F is also of rubber and one half of it is glued, as by means of a layer of adhesive, to one half of the float face of the body section C, as shown in Figure 3 of the drawing. The other half is free to be moved and is not cemented to this flat face of the cork section C, as is shown in Figure 3 of the drawing.

The section C is provided with a diametrical-shaped passageway 30 on the flat face of said section on an axis normal to the plane in which the spring D lies. The free flat portion of the rubber disc or lining F may be moved so that a line may be slipped between the flat face of the section C and the lining F to position the line for free sliding in the passageway 30. At the line entrance side of the float A, the lining F is beveled at 23.

It will thus be seen that the linings E and F are respectively attached permanently to the sections B and C of the float A.

When the spring D is in position for holding the sections B and C in their spherical relation, the free end of the spring means D extends transversely thru suitable passageways 25 provided in the disc linings E and F so that this end of the clamping spring may be seated in the socket 12 above mentioned.

When the float A is used upon a line for stationary fishing, the sections B and C are manually moved apart at the side of the float where the beveled surfaces 20 and 23 of the linings G and F are provided, sufficient to remove the free ends of the anchoring spring from the division line of the float sections B and C. A line may then be slipped into the way between the resilient friction providing layers E and F, and the bevel 20 facilitates the entrance of the line to position it between these layers E and F. Thereafter, releasing the spring will cause sections of the float to clamp the line between the layers E and F in the proper position upon the line for stationary fishing. It is noted that the end of the spring D anchors the line against the possibility of lateral removal of the line from the float, so that there is no danger of losing the latter.

When the float A is used for casting purposes, the sections B and C are held apart as above described, and the line is then slipped between the layer F and the facing surface of the section and moved into the passageway 30. The line moves freely in this passageway.

It is to be understood that the improved float of this invention may be made in various shapes and that various materials may be utilized for the various parts thereof. The details of the invention may also be rearranged without departing from the spirit of the invention or the scope of the claims.

I claim:

1. In a fishing float the combination of a substantially spherical-shaped buoyant body having a transversely disposed line receiving passageway therethru of a width to permit free sliding of the line therethrough, said spherical-shaped buoyant body having a way from the exterior thereof tangentially intersecting the said passageway to permit the selective disposition of a fishing line in the way or in the passageway, and friction providing means in said way for clamping upon said line to anchor the float upon the line at a predetermined location except when the line is in said passageway.

2. In a fishing float the combination of a substantially spherical-shaped buoyant body having a transversely disposed line receiving passageway of a diameter to freely slidably receive the line, said spherical-shaped buoyant body having a way from the exterior thereof intersecting the said passageway to permit the selective disposition of a fishing line in the way or in the passageway, friction providing means in said way for holding said line to anchor the float upon the line at a predetermined location except when the line is in said passageway, and spring means acting in a plane transverse to the plane of the way for clamping the body of the float at opposite sides of said way in a clamped relation upon the fishing line disposed in said way.

3. In a fishing float, the combination of complementary hemispherical-shaped buoyant bodies adapted to be placed together to form a sphere with the facing surfaces thereof parallel, means yieldably clamping said hemispherical portions together to form a sphere, and means disposed between the facing surfaces of said hemispherical-shaped portions to either clamp or slidably receive a fishing line therebetween without disarranging the parallel disposition of said facing surfaces.

4. In a fishing float, the combination of a pair of complementary buoyant body sections having flat facing surfaces disposed in parallel planes, a transverse opening groove in one flat surface of one of said sections, means to detachably hold said sections in assembled relation with the facing surfaces parallel, and yieldable line retaining friction providing means clamped between the facing surfaces of said sections.

5. As an article of manufacture, a spherical-shaped fishing float transversely divided into hemispherical-shaped sections of a buoyant nature, an annular spring secured circumferentially upon said sections in a plane transverse to the division plane of said sections and acting to normally urge said sections towards each other, a yieldable friction providing lining attached in entirety to the face of one of said sections, and a friction providing lining disc attached at one side of a diametrical line to the complementary face of the other section, said last mentioned lining disc being adapted to cover the other side of the face of said last named section, said last named section having a passageway groove in said complementary face thereof in a line normal to the plane of the spring above mentioned.

6. A fishing float comprising a plurality of symmetrically formed buoyant parts which are individually separable, a clamping ring for clamping said parts together, and friction providing material lining the facing surfaces of said parts with which a line is adapted to contact to frictionally hold the line in position, one of said parts in the surface which faces the lining between said part and a complementary part being grooved entirely across said part so as to provide a passageway when the parts are assembled which will freely slidably receive the fishing line.

7. A fishing float comprising a buoyant body having a way formed therein, clamping means, and a pair of yieldable rubber disks lining said way between which a fishing line is adapted to be clamped by said clamping means in secure relation therebetween.

8. A fishing float comprising a buoyant body having a way therein opening laterally thereon and extending into the buoyant body, said buoyant body in substantially the central portion thereof having a passageway therethru opening laterally into the way for freely slidably receiving a fishing line so that it can be slid back and forth therein at all times during use, and a pair of resilient and yieldable friction providing disc members lining the facing surfaces of said way and between which the fishing line is adapted to be non-slidably secured.

9. A float for fishing lines comprising a buoyant body having a way therein opening upon the outer surface of the float so as to permit lateral slipping of a line therein, clamping means, and resilient and inherently yieldable friction providing material lining the faces of said way between which the fishing line is adapted to be detachably clamped by said clamping means in frictional engagement with said friction providing material.

10. In a fishing float the combination of a buoyant body transversely divided into portions to provide a way permitting the assemblage of a fishing line therebetween, means yieldably clamping the portions of the body forming said way upon a fishing line which is disposed therebetween, and an enlarged line receiving passageway transversely through the buoyant body not formed as a part of said way but longitudinally open to said way to permit the free slidable assemblage of a fishing line through said way and into said passageway.

11. In a fishing float the combination of a buoyant body transversely divided to provide a way opening upon the outer surface thereof to permit the assemblage of a fishing line in the way, means yieldably clamping the portions of the float forming said way upon a fishing line which is disposed in said way, and inherently yieldable friction providing material lining the faces of said way between which the fishing line is adapted to be clamped and impressed therein as an incident of the aforesaid clamping.

LOUIS SYKORA.